US012750599B2

(12) United States Patent
Mizuno et al.

(10) Patent No.: US 12,750,599 B2
(45) Date of Patent: Sep. 29, 2026

(54) SIGNAL PROCESSING CIRCUIT, SIGNAL PROCESSING METHOD, AND PROGRAM FOR PROCESSING EVENT SIGNALS OF EVENT-BASED VISION SENSOR

(71) Applicant: Sony Interactive Entertainment Inc., Tokyo (JP)

(72) Inventors: Masayoshi Mizuno, Tokyo (JP); Hideaki Iwaki, Kanagawa (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 45 days.

(21) Appl. No.: 18/855,384

(22) PCT Filed: Apr. 27, 2022

(86) PCT No.: PCT/JP2022/019024
§ 371 (c)(1),
(2) Date: Oct. 9, 2024

(87) PCT Pub. No.: WO2023/209843
PCT Pub. Date: Nov. 2, 2023

(65) Prior Publication Data

US 2025/0274675 A1 Aug. 28, 2025

(51) Int. Cl.
*H04N 25/47* (2023.01)
*H04N 25/707* (2023.01)

(52) U.S. Cl.
CPC ........... *H04N 25/47* (2023.01); *H04N 25/707* (2023.01)

(58) Field of Classification Search
CPC ............................ H04N 25/47; H04N 25/707
See application file for complete search history.

(56) References Cited

U.S. PATENT DOCUMENTS

| | | | | |
|---|---|---|---|---|
| 11,122,224 | B2 | 9/2021 | Suh | |
| 2016/0187990 | A1 | 6/2016 | Lee | |
| 2018/0146149 | A1 | 5/2018 | Suh | |
| 2018/0167575 | A1* | 6/2018 | Watanabe | H04N 25/78 |

FOREIGN PATENT DOCUMENTS

| | | | |
|---|---|---|---|
| JP | 2014535098 | A | 12/2014 |
| JP | 2018085725 | A | 5/2018 |
| JP | 2022063000 | A | 4/2022 |
| WO | 2021111873 | A1 | 6/2021 |

OTHER PUBLICATIONS

International Search Report for corresponding PCT Application No. PCT/JP2022/019024, 4 pages, dated Jul. 26, 2022.

* cited by examiner

*Primary Examiner* — Nicholas G Giles
(74) *Attorney, Agent, or Firm* — Kilpatrick Townsend & Stockton LLP

(57) ABSTRACT

There is provided a signal processing circuit that processes an event signal generated in an EVS. The signal processing circuit includes a memory for storing a program code and a processor for executing operation in accordance with the program code. The operation includes detecting the relation among at least either positions in a block obtained by dividing a detection region of the EVS regarding the event signals generated in the block or the clock times at which the event signals have been generated.

20 Claims, 8 Drawing Sheets

BLP=(pos, r, θs, θe)(Tnew, Duration)

SIGNAL PROCESSING CIRCUIT, SIGNAL PROCESSING METHOD, AND PROGRAM FOR PROCESSING EVENT SIGNALS OF EVENT-BASED VISION SENSOR

TECHNICAL FIELD

The present invention relates to a signal processing circuit, a signal processing method, and a program.

BACKGROUND ART

An EVS (event-based vision sensor) in which a pixel that has detected intensity change of incident light generates a signal asynchronously in terms of time is known. The EVS is referred to also as an EDS (Event Driven Sensor), an event camera, or a DVS (Dynamic Vision Sensor), and includes a sensor array configured by sensors including a light receiving element. When the sensor has detected intensity change of incident light, more specifically, luminance change of an object surface, an EVS 110 generates an event signal including a timestamp, identification information of the sensor, and information regarding the polarity of the luminance change. The EVS is advantageous in that it can operate at a high speed by low power compared with a frame-type vision sensor, which scans all pixels at a predetermined cycle, specifically, image sensors of CCD (Charge Coupled Device), CMOS (Complementary Metal Oxide Semiconductor), and the like. Techniques relating to such an EVS are described in PTL 1 and PTL 2, for example.

CITATION LIST

Patent Literature

[PTL 1] Japanese Patent Laid-open No. 2014-535098
[PTL 2] Japanese Patent Laid-open No. 2018-85725

SUMMARY

Technical Problem

Yet, knowledge in methods used in the frame-type vision sensor as processing of a signal generated in the vision sensor has been accumulated. Thus, there is a tendency that the event signal generated by the EVS is also similarly sorted in the spatial direction and is made two-dimensional to be processed. In this case, the processing is executed after redundant information is added to the event signal generated asynchronously in terms of time. This leads to failure in sufficient utilization of the high speed operation of the EVS.

Thus, the present invention intends to provide a signal processing circuit, a signal processing method, and a program that can process, at a higher speed, an event signal generated by an EVS.

Solution to Problem

According to an aspect of the present invention, there is provided a signal processing circuit that processes an event signal generated in an EVS. The signal processing circuit includes a memory for storing a program code and a processor for executing operation in accordance with the program code. The operation includes detecting a relation among at least either positions in a block obtained by dividing a detection region of the EVS regarding the event signals generated in the block or clock times at which the event signals have been generated.

According to another aspect of the present invention, there is provided a signal processing method for processing an event signal generated in an EVS. The signal processing method includes, by operation executed by a processor in accordance with a program code stored in a memory, detecting a relation among at least either positions in a block obtained by dividing a detection region of the EVS regarding the event signals generated in the block or clock times at which the event signals have been generated.

According to yet another aspect of the present invention, there is provided a program for processing an event signal generated in an EVS. Operation executed by a processor in accordance with the program includes detecting a relation among at least either positions in a block obtained by dividing a detection region of the EVS regarding the event signals generated in the block or clock times at which the event signals have been generated.

DESCRIPTION OF EMBODIMENT

Figure 1:
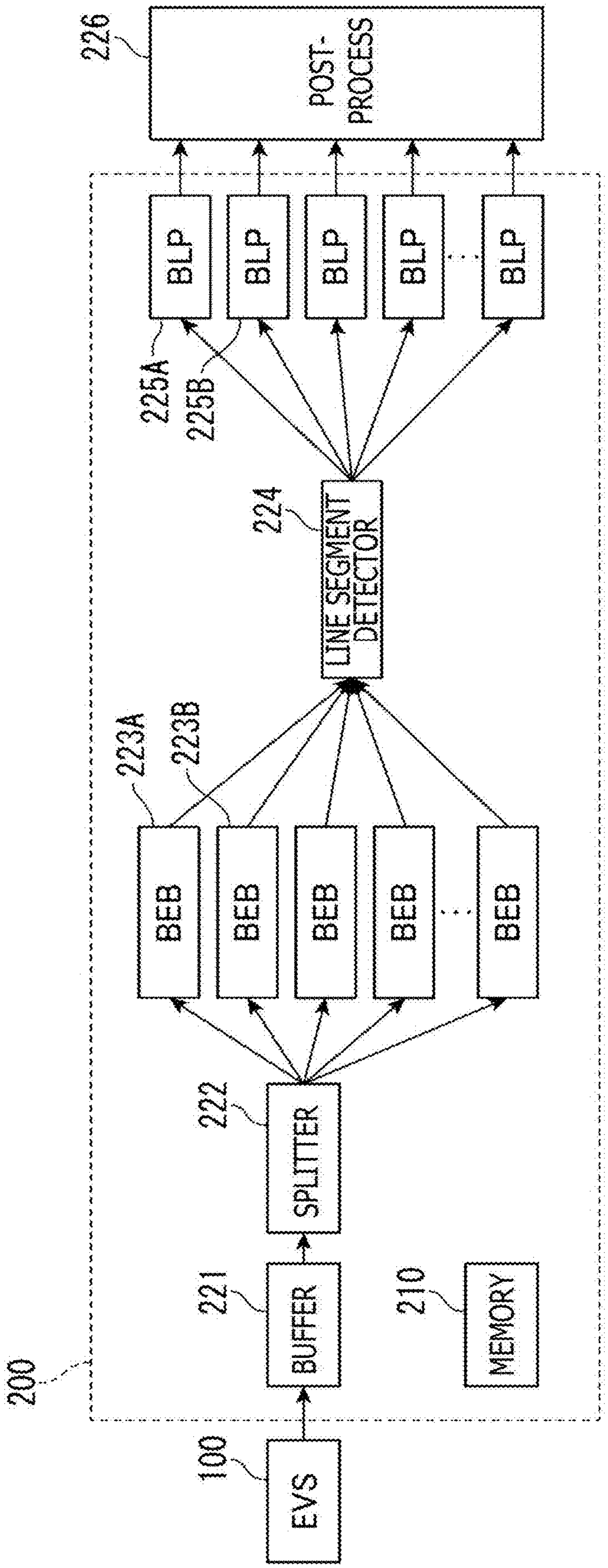
FIG. 1 is a diagram schematically illustrating a configuration of a signal processing circuit according to one embodiment of the present invention.

FIG. 1 is a diagram schematically illustrating a configuration of a signal processing circuit according to one embodiment of the present invention. A signal processing circuit 200 that processes an event signal generated by an EVS 100 is configured by processing circuits such as a CPU (Central Processing Unit), a DSP (Digital Signal Processor), an ASIC (Application Specific Integrated Circuit), and/or an FPGA (Field-Programmable Gate Array), for example. A memory 210 configured by, for example, various kinds of ROM (Read Only Memory), RAM (Random Access Memory), and/or the like is included in the signal processing circuit 200. The signal processing circuit 200 executes operation to be described below, in accordance with a program code stored in the memory 210. Note that part or the whole of a post-process 226 may be executed by the signal processing circuit 200 or the post-process 226 may be executed by an apparatus or circuit different from the signal processing circuit 200.

Figure 2:
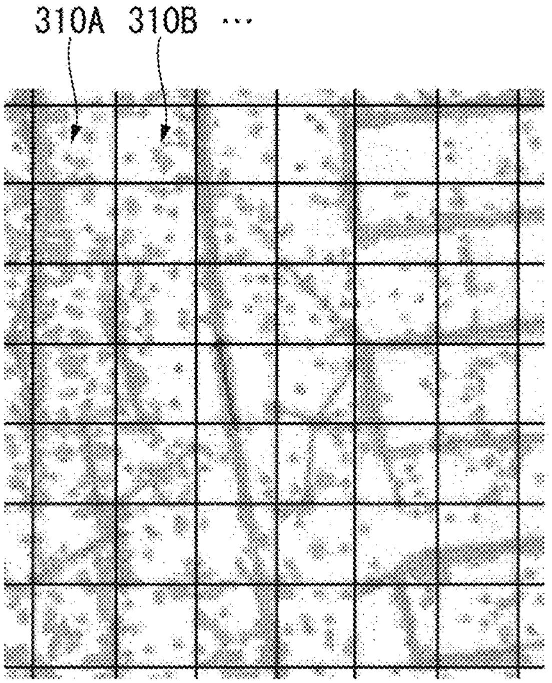
FIG. 2 is a schematic diagram illustrating an example of blocks and events.

The event signal generated by the EVS 100 is temporarily held by a buffer 221 and is distributed to a block event buffer (BEB) 223A, 223B, . . . (hereinafter, generically referred to also as a BEB 223) by a splitter 222. Here, the splitter 222 distributes the event signal generated in each of lattice-like blocks 310A, 310B, . . . (hereinafter, generically referred to also as a block 310) obtained by dividing a detection region of the EVS 100, for example, as illustrated in FIG. 2 to the corresponding BEB 223A, 223B, . . . . The BEB 223 is defined in advance as a buffer that temporarily holds the event signal corresponding to each of the lattice-like blocks 310 obtained by dividing the detection region of the EVS 100. In the case in which the setting of the block 310 is dynamically changed as in an example to be described later, the definition of the BEB 223 is also dynamically changed corresponding to the setting of the block 310. The event signal includes, for example, a position x, y in the detection region and a clock time t at which the event signal has been generated, as information. The splitter 222 refers to the information indicating the position x, y and decides the BEB 223 to which the event signal is to be distributed. As in an example to be described later, the splitter 222 may replicate the event signal and distribute the event signals to two or more BEBs 223.

The event signal generated in each block 310 is held in the BEB 223. When the event signal is distributed to any of the BEBs 223A, 223B, . . . , a line segment detector 224 detects a line segment from a set of the positions x, y of the event signals held in the BEB 223. For example, in the case in which an event has occurred due to movement of an edge of an object in a certain block 310, the set of the positions x, y of the event signals forms a line segment. Although the edge of the object is not necessarily a straight line, setting of an appropriate size for the lattice-like block 310 can express the edge of the object as a set of line segments. The line segment detector 224 may detect a plurality of line segments for one block 310 by using the Hough transform, for example. As in an example to be described later, the detector may detect a curve or another figure from a set of the positions x, y of the event signals.

The line segment detector 224 outputs a BLP 225A, 225B, . . . (hereinafter, generically referred to also as a BLP 225) indicating the detected line segment. The BLP 225A is information indicating a line segment detected by the line segment detector 224 from the event signal that has been generated in the block 310 A and been held in the BEB 323A. This is the same also for the BLP 225B and the subsequent BLPs. Note that the BLPs 225A, 225B, . . . are not necessarily synchronously output and are asynchronously output by processing executed by the line segment detector 224 when the event signal is distributed to any BEB 223 as described above. The output BLP 225 is used as information indicating a detection result by the EVS 100 in the post-process 226. As the post-process 226, for example, detection of motion of a subject, matching of a three-dimensional shape with respect to a subject, processing by a recognizer using machine learning, or the like is executed.

Figure 3:
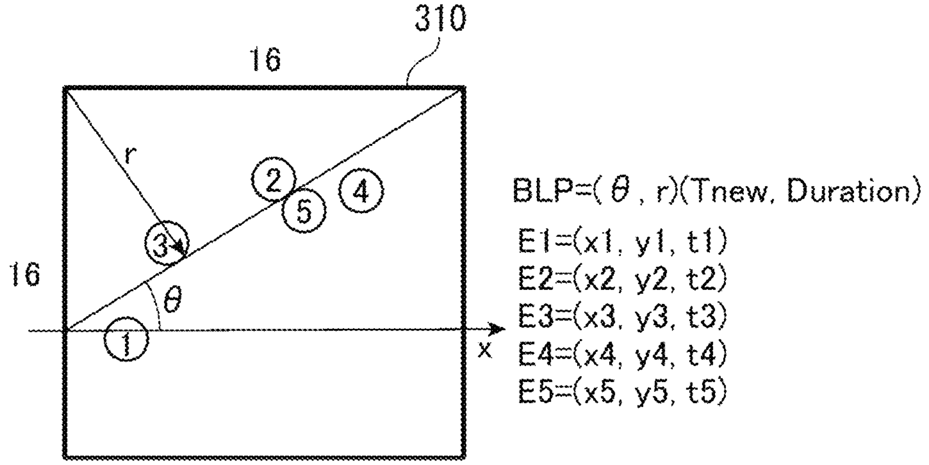
FIG. 3 is a diagram for explaining an example of detection of a line segment in an example illustrated in FIG. 1.

FIG. 3 is a diagram for explaining an example of detection of a line segment in the example illustrated in FIG. 1. As described above, in the present embodiment, the line segment detector 224 executes processing of detecting a line segment from a set of the positions x, y of the event signals when the event signal is distributed to the BEB 223 corresponding to each of the lattice-like blocks 310 obtained by dividing the detection region of the EVS 100. In the example illustrated in FIG. 3, the processing of detecting a line segment in the case in which five event signals exist in the BEB 223 (the number of actual event signals may be larger) is schematically illustrated. Event signals E1 to E5 include respective positions x1 to x5, y1 to y5 in the detection region and clock times t1 to t5 at which the event signals E1 to E5 have been generated, as information. The positions x1 to x5, y1 to y5 all indicate the position in the block 310 of the processing target. Hence, when the size of the block 310 (in the illustrated example, 16 pixels×16 pixels) is appropriate, the event information does not need to be sorted in the spatial direction and the time direction, and the line segment detector 224 can mathematically detect a line segment from the positions x1 to x5, y1 to y5 of the event signals E1 to E5 held in the BEB 223. Specifically, the line segment detector 224 may calculate an approximate straight line in such a manner as to regard the positions x1 to x5 and y1 to y5 as two-dimensional distribution, or may detect a line segment by using the Hough transform.

Here, for example, an upper limit may be set for the number of event signals held in the BEB 223, and the oldest event signal may be deleted when a new event signal is distributed, by a FIFO (First In, First Out) system. Alternatively, regarding the clock time t of the event signal, a threshold may be set for the difference from the processing clock time or the clock time t of the latest event signal, and the event signal regarding which the difference exceeds the threshold may be kept from being used for detection of a line segment by the line segment detector 224 or be deleted from the BEB 223. As described above, the deletion of the old event signal or the condition setting regarding the clock time t of the event signal may be executed. Also in these cases, the event signal does not need to be sorted in the time direction for detection of a line segment.

Further, in the case in which the event signal of the same position x, y as the event signal held in the BEB 223 is newly distributed, for example, the clock time t of the held event signal may be updated by the clock time t of the newly distributed event signal to avoid overlapping of the event signals of the same position x, y in the BEB 223. In this case, by employing the fact that the event signals of the same position x, y do not overlap as the premise, for example, the speed of computation for detecting a line segment can be enhanced. Alternatively, a plurality of event signals with the same position x, y but different clock times t may be held in the BEB 223. In this case, for example, as in an example to be described later, the accuracy in the case of detecting the relation among the clock times at which the event signals have been generated improves.

In the example illustrated in FIG. 3 in the above description, the line segment detector 224 outputs the block line parameter (BLP) including an angle (θ), a distance (r), a latest event clock time (Tnew), and event duration (Duration). The angle (θ) indicates the tilt of the line segment with respect to an x-axis, and the distance (r) indicates the distance (length of the perpendicular line) from the upper left corner of the block to the line segment. However, the configuration is not limited to this example, and any line segment can be identified in accordance with another publicly known method (for example, by two parameters indicating the tilt and the relative position with respect to the block regarding the line segment). The latest event clock time (Tnew) is the clock time corresponding to the latest event signal among the event signals used for detection of the line segment. For example, the latest event clock time (Tnew) may be identified by extracting the latest clock time from the clock times t1 to t5 of the event signals E1 to E5 used for the detection of the line segment (in the case of the example of FIG. 3, Tnew=t5). Alternatively, since detection of a line segment is executed when the latest event signal is distributed to the BEB 232, without reference being made to the clock times of the event signals E1 to E5, the clock time at which the line segment detector 224 has output the BLP 225 or the clock time at which the post-process 226 has received the BLP 225 may be set as the latest event clock time (Tnew).

The event duration is the difference between the first clock time and the last clock time among the clock times t1 to t5 of the event signals E1 to E5 used for detection of the line segment (that is, in the example of FIG. 3, Duration=t5−t1). It is possible to know the time of the occurrence of the event signal on which detection of the line segment is based, from the information regarding the event duration. For example, in the case in which the event duration is significantly long, it may be determined that many event signals detected as noise are used for detection of the line segment and, for example, the reliability of the detected line segment is low in the post-process 226. As described above, the event duration can be useful as information indicating the relation among the clock times at which the event signals have been generated in each block 310. As information similarly indicating the relation among the clock times at which the event signals have been generated, the line segment detector 224 may output a variance Var[t] on the time series regarding the clock times at which the event signals have been generated. In this case, in the post-process 226, in the case in which the variance Var[t] is low although the event duration is long, it can be determined that the reliability of the detected line segment is high. Furthermore, in the case in which the event duration is long and the Var[t] is also high, it can be determined that the reliability of the detected line segment is high.

In the present embodiment, detection of a line segment from the event signal by the line segment detector 224 is an example of detection of the relation among the positions in the block regarding the event signals generated in the block 310. As another example of the relation among the positions, the line segment detector 224 may output a variance Var[x, y] of the positions of the event signals used for detection of the line segment. In this case, in the post-process 226, in the case in which the variance Var[x, y] is high although a line segment has been detected, it can be determined that the reliability of the detected line segment is low. For example, the variance Var[x, y] becomes high in the case in which the event signals detected as noise accidentally exhibit distribution close to a line segment. Conversely, in the case in which the variance Var[x, y] is low, it can be determined that the reliability of the detected line segment is high.

Figure 4:
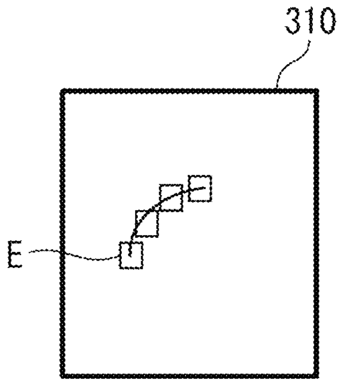
FIG. 4 is a diagram illustrating another example of detection of a figure formed by a set of positions of event signals.

FIG. 4 is a diagram illustrating another example of detection of a figure formed by a set of the positions of the event signals. In the illustrated example, a detector disposed in addition to or instead of the line segment detector 224 illustrated in FIG. 1 detects a circular arc from a set of the positions x, y of event signals E. In this case, the detector outputs the block line parameter (BLP) including a position (pos) of the center of the circle, a radius (r), a starting point angle (θs), an ending point angle (θe), the latest event clock time (Tnew), and the event duration (Duration). As described above, as the relation among the positions in the block regarding the event signals generated in the block 310, a curve such as a circular arc or an elliptic arc formed by a set of the positions of the event signals may be detected.

Figure 5:
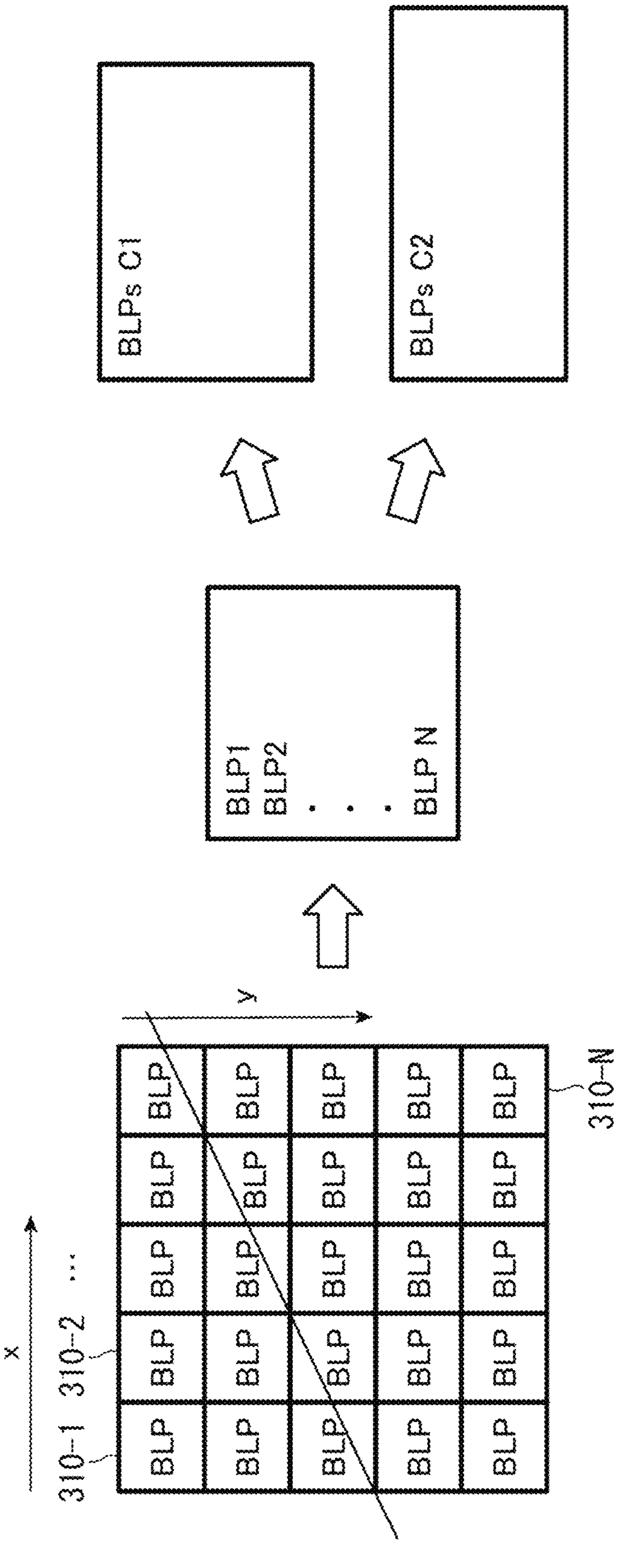
FIG. 5 is a diagram for explaining an example of processing using BLPs (Block Line Parameters).

FIG. 5 is a diagram for explaining an example of processing using the BLPs. As described above, in the present embodiment, the BLP is output for each block 310 obtained by dividing the detection region of the EVS 100. For example, movement and rotation of a line segment detected in a block 310-1 can be calculated by comparing BLP1 (A, t) output at the clock time t for the block 310-1 with BLP1 (A, t−et) output previously (at the clock time earlier than the clock time t by et) for the same block 310-1. In the post-process 226, according to such a calculation result, the BLPs close to each other in the movement direction or the rotation direction among BLP1, BLP2, . . . , BLPN output for the blocks 310-1, 310-2, . . . , 310-N, respectively, are classified into a cluster. This can identify clusters (event line segment clusters) BLPs C1 and BLPs C2 of the BLPs for which a common line segment is estimated to have been detected. Computation of an affine transformation or the like on a figure that ranges over a plurality of blocks can be executed in reference to the BLPs classified into the same event line segment cluster. Note that, although a straight line that ranges over a plurality of blocks is illustrated in FIG. 5, for example, it is also possible to similarly treat a curve as a set of line segments in which the tilt changes little by little in each block.

In the present embodiment, the result of the above-described processing can be used in, for example, detection of motion of a subject, matching of a three-dimensional shape with respect to a subject, processing by a recognizer using machine learning, or the like in the post-process 226. The BLP 225 has a small size compared with, for example, data arising from sorting of the event signal in the spatial direction and mapping the event signal on two-dimensional coordinates of the whole of the detection region. Further, the line segment expressed by the BLP 225 can be treated as a highly accurate figure that is not restricted by the spatial resolution of the EVS 100. Therefore, computation of an affine transformation or the like on a figure detected from the event signal can be accurately executed at a high speed.

Figure 6:
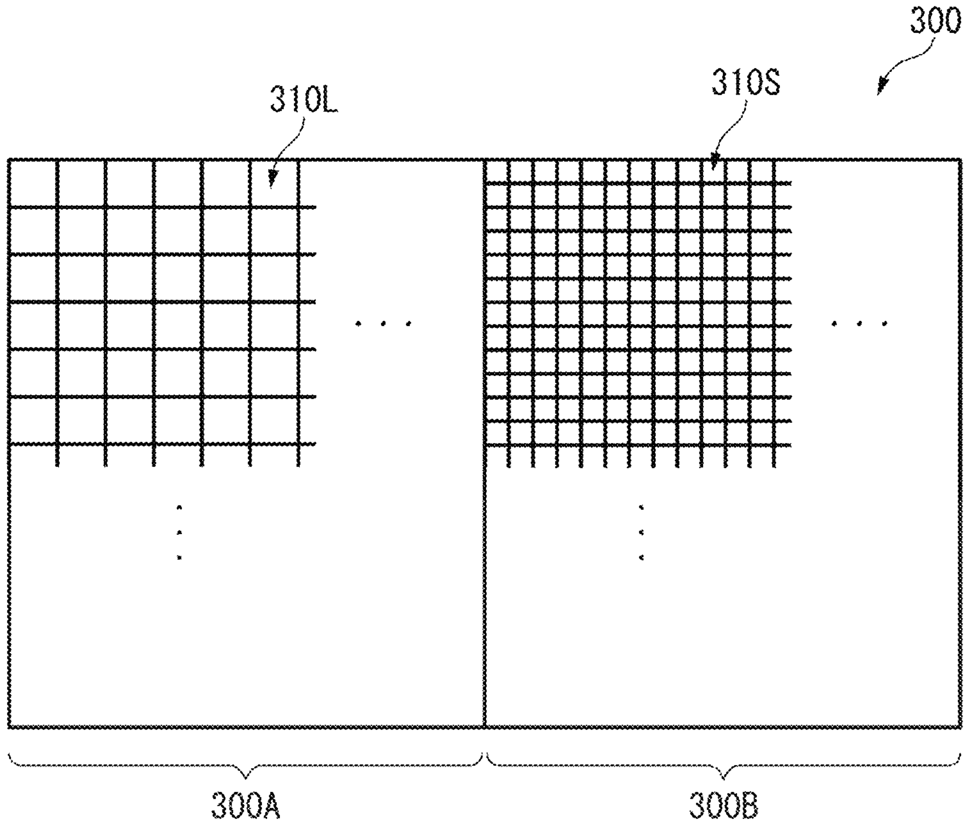
FIG. 6 is a diagram illustrating a modification example of arrangement of the blocks.
Figure 7:
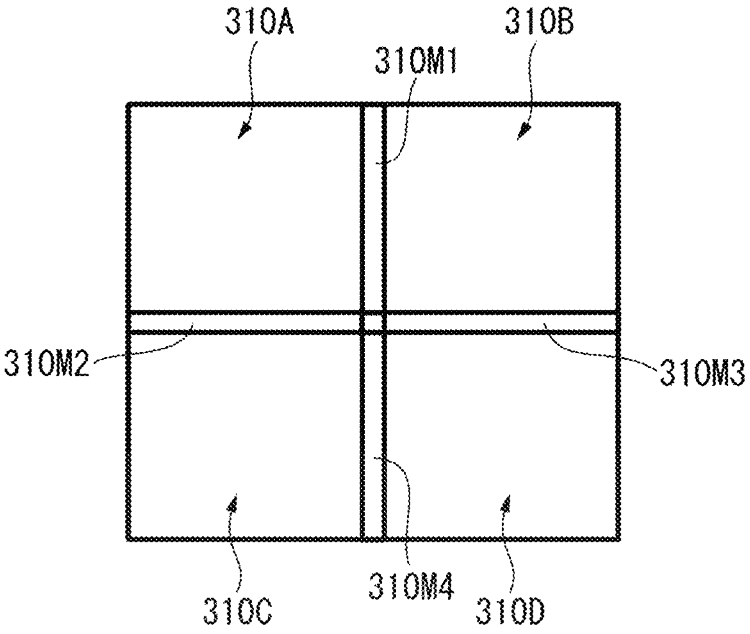
FIG. 7 is a diagram illustrating a modification example of the arrangement of the blocks.
Figure 8:
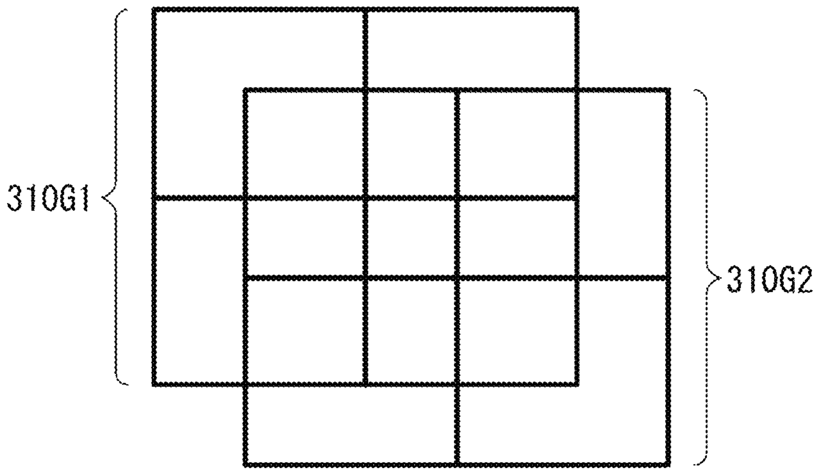
FIG. 8 is a diagram illustrating a modification example of the arrangement of the blocks.

FIGS. 6 to 8 are diagrams illustrating modification examples of arrangement of the blocks. In an example illustrated in FIG. 6, the blocks 310 with sizes different for each part are set in a detection region 300 of the EVS 100. Specifically, blocks 310L with a larger size (for example, 16 pixels×16 pixels) are set in a part 300A of the detection region 300, and blocks 310S with a smaller size (for example, eight pixels×eight pixels) are set in another part 300B. In the part in which the blocks 310 with the smaller size are set (in the above-described example, the part 300B), the relation among the event signals as the one described above can be detected with a higher resolution. Meanwhile, in the part in which the blocks 310 with the larger size are set (in the above-described example, the part 300A), the number of BEBs 223 can be suppressed, and processing resources of the signal processing circuit 200 can be saved.

The size of the block 310 in the above-described example may be dynamically changed according to, for example, the detection result of the relation among the positions or the clock times of the event signals. For example, a smaller size of the block 310 may be set in a part including the block in which a line segment has been detected from the event signal by the line segment detector 224, and a larger size of the block 310 may be set in a part that does not include the block in which a line segment has been detected. Alternatively, in a part including the block regarding which the variance Var[t] on the time series regarding the clock time at which the event signal has been generated or the variance Var[x, y] of the position is equal to or lower than a predetermined threshold, the possibility that a line segment or the like with high reliability is detected is high and hence a smaller size of the block 310 may be set. In this case, a larger size of the block 310 is set in a part including the block regarding which the variance Var[t] or the variance Var[x, y] is higher than the predetermined threshold.

In an example illustrated in FIG. 7, the blocks 310A to 310D are each disposed to partly overlap. More specifically, the block 310A and the block 310B adjacent to each other overlap in a region 310M1. Similarly, the block 310A and the block 310C overlap in a region 310M2. The block 310B and the block 310D overlap in a region 310M3. The block 310C and the block 310D overlap in a region 310M4. Owing to such arrangement of the blocks 310, for example, a line segment can be appropriately detected even in the case in which the positions of the event signals are distributed along the boundary of the block. In this example, the splitter 222 illustrated in FIG. 1 replicates the event signals located in the regions 310M1 to 310M4 at the block boundary and distributes the event signals to the BEBs 223 corresponding to the respective blocks.

In an example illustrated in FIG. 8, the blocks 310 include a block group 310G1 and a block group 310G2, and the block groups 310G1 and 310G2 cover the same region in an overlapping manner. Further, the boundaries of the blocks differ in the block groups 310G1 and 310G2. That is, in this example, as a result of the same region being covered by the block groups 310G1 and 310G2 with different boundaries, even in the case in which the positions of events are distributed along the boundary of the block in one block group 310G1, a line segment can be detected in the other block group 310G2 (vice versa). Note that the region covered by the block groups 310G1 and 310G2 in an overlapping manner does not need to be the whole of the detection region of the EVS 100 and may be part thereof. In this case, the region covered in an overlapping manner may be dynamically changed according to the detection result of the relation among the positions or the clock times of the event signals similarly to, for example, the part in which the blocks 310 with a smaller size are set, described in the example of FIG. 6. In this example, the splitter 222 illustrated in FIG. 1 replicates the event signal in the region covered in an overlapping manner and distributes the event signals to the BEBs 223 corresponding to both blocks of the block groups 310G1 and 310G2.

REFERENCE SIGNS LIST

100: EVS
200: Signal processing circuit
210: Memory
221: Buffer
222: Splitter
223: Block event buffer (BEB)
224: Line segment detector
335: Block line parameter (BLP)
226: Post-process
300: Detection region
300A, 300B: Part
310: Block
310-1, 310-2, 310A, 310B, 310C, 310D, 310L, 310S: Block
310G1, 310G2: Block group

The invention claimed is:

1. A signal processing circuit comprising:
a memory for storing a program code; and
a processor for executing operations in accordance with the program code, wherein
the operations include:
processing one or more event signals generated in an event-based vision sensor;
dividing a detection region of the event-based vision sensor into a plurality of blocks;
distributing the one or more event signals generated in a block among the plurality of blocks to a block event buffer corresponding to the block;
detecting, by a detector, a figure including a set of positions of the one or more event signals in the block event buffer; and
outputting, from the detector, a block line parameter indicating the detected figure as a relation among the set of positions in the block event buffer.

2. The signal processing circuit according to claim 1, wherein the figure includes at least one line segment.

3. The signal processing circuit according to claim 1, wherein the figure includes a curve.

4. The signal processing circuit according to claim 1, wherein the operations further include detecting a relation among clock times when the one or more event signals in the block are generated, and
wherein the relation includes a variance on a time series regarding the clock times at which the event signals have been generated.

5. The signal processing circuit according to claim 1, wherein the operation further includes setting a size of the block different between a first part and a second part of the detection region.

6. The signal processing circuit according to claim 1, wherein the operation further includes dynamically changing a size of the block according to a detection result.

7. The signal processing circuit according to claim 1, wherein the block has a lattice shape.

8. The signal processing circuit according to claim 1, wherein the block includes a first block and a second block adjacent to each other, and the first block and the second block partly overlap.

9. The signal processing circuit according to claim 1, wherein the block includes a first block group and a second block group that overlaps with the first block group and has a boundary different from that of the first block group, and at least part of the detection region is covered by the first block group and the second block group in an overlapping manner.

10. A signal processing method comprising:
distributing one or more event signals generated in a block, obtained by dividing a detection region of an event-based vision sensor, to a block event buffer corresponding to the block;
detecting, by a detector, a figure including a set of positions of the one or more event signals in the block event buffer; and
outputting, from the detector, a block line parameter indicating the detected figure as a relation among the positions in the block event buffer.

11. The method of claim 10, further comprising setting a size of the block different between a first part and a second part of the detection region.

12. The method of claim 10, further comprising dynamically changing a size of the block according to a detection result.

13. The method of claim 10, wherein the block includes a first block and a second block adjacent to each other, and the first block and the second block partly overlap.

14. The method of claim 10, wherein the block includes a first block group and a second block group that overlaps with the first block group and has a boundary different from that of the first block group, and at least part of the detection region is covered by the first block group and the second block group in an overlapping manner.

15. A non-transitory computer-readable medium storing computer-readable instructions that, when executed by one or more processors, cause the one or more processors to perform operations, comprising:

distributing one or more event signals generated in a block, obtained by dividing a detection region of an event-based vision sensor, to a block event buffer corresponding to the block;

detecting, by a detector, a figure including a set of positions of the one or more event signals in the block event buffer; and outputting, from the detector, a block line parameter indicating the detected figure as a relation among the positions in the block event buffer.

16. The non-transitory computer-readable medium of claim 15, wherein the operations further comprise setting a size of the block different between a first part and a second part of the detection region.

17. The non-transitory computer-readable medium of claim 15, wherein the operations further comprise dynamically changing a size of the block according to a detection result.

18. The non-transitory computer-readable medium of claim 15, wherein the block includes a first block and a second block adjacent to each other, and the first block and the second block partly overlap.

19. The non-transitory computer-readable medium of claim 15, wherein the block includes a first block group and a second block group that overlaps with the first block group and has a boundary different from that of the first block group, and at least part of the detection region is covered by the first block group and the second block group in an overlapping manner.

20. The non-transitory computer-readable medium of claim 15, wherein the operations further include detecting a relation amongst clock times when the one or more event signals in the block are generated, and wherein the relation includes a variance on a time series regarding the clock times at which the event signals have been generated.

* * * * *